(12) United States Patent
Butt et al.

(10) Patent No.: US 9,105,885 B2
(45) Date of Patent: Aug. 11, 2015

(54) APPARATUS FOR CONDITIONING TEMPERATURE OF A FLUID STREAM

(75) Inventors: Shazad Mahmood Butt, Troy, MI (US); Matthew N. Zuehik, Royal Oak, MI (US); Jaswant-Jas S. Dhillon, Canton, MI (US); Joseph Stanek, Northville, MI (US); Scott Aaron Black, Royal Oak, MI (US); James A. Adams, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 252 days.

(21) Appl. No.: 11/839,566

(22) Filed: Aug. 16, 2007

(65) Prior Publication Data

US 2009/0047552 A1     Feb. 19, 2009

(51) Int. Cl.
*H01M 8/04*     (2006.01)
*F28D 21/00*    (2006.01)

(52) U.S. Cl.
CPC ...... *H01M 8/04007* (2013.01); *H01M 8/04074* (2013.01); *H01M 8/04126* (2013.01); *F28D 2021/0043* (2013.01); *Y02E 60/50* (2013.01)

(58) Field of Classification Search
CPC ............... H01M 8/04007; H01M 8/04126; H01M 8/04074; F28D 2021/0043
USPC ............... 429/13, 22, 26, 436, 440
See application file for complete search history.

(56) References Cited

U.S. PATENT DOCUMENTS

| | | | |
|---|---|---|---|
| 4,248,049 A * | 2/1981 | Briley ..................... | 62/235.1 |
| 6,013,385 A | 1/2000 | DuBose | |
| 6,082,447 A * | 7/2000 | Insalaco et al. ............ | 165/174 |
| 6,383,671 B1 | 5/2002 | Andrews et al. | |
| 6,692,852 B2 | 2/2004 | Yang | |
| 6,783,878 B2 | 8/2004 | Voss et al. | |
| 6,884,534 B2 | 4/2005 | Wheat et al. | |
| 6,994,267 B2 | 2/2006 | Hwang | |
| 7,018,732 B2 | 3/2006 | Cargnelli et al. | |
| 2002/0177017 A1 * | 11/2002 | Nelson et al. ................. | 429/22 |
| 2003/0190513 A1 | 10/2003 | Meissner et al. | |
| 2005/0260480 A1 | 11/2005 | Hild et al. | |
| 2006/0251943 A1 * | 11/2006 | Hatoh et al. ................. | 429/32 |
| 2006/0263652 A1 * | 11/2006 | Logan .......................... | 429/13 |
| 2008/0020247 A1 * | 1/2008 | Valensa et al. ............... | 429/13 |

FOREIGN PATENT DOCUMENTS

| | | | | |
|---|---|---|---|---|
| EP | 1349225 A1 | 10/2003 | | |
| WO | 9905741 A1 | 2/1999 | | |
| WO | 2004055928 A2 | 7/2004 | | |
| WO | WO2004055928 | * | 7/2004 | ............ H01M 8/00 |
| WO | 2004107484 A2 | 12/2004 | | |

* cited by examiner

*Primary Examiner* — Maria J Laios
(74) *Attorney, Agent, or Firm* — Damian Porcari; Brooks Kushman P.C.

(57) ABSTRACT

A system and method for conditioning the temperature of at least one fluid stream that is passed through a fuel cell stack is provided. The system comprises a system module, at least one inlet and a conditioning device. The system module is operable to humidify the fluid stream to a reach a predetermined humidity level that corresponds to a predetermined temperature. The one inlet of the fuel cell stack receives the fluid stream at a first temperature that is different from the predetermined temperature. The fuel cell stack includes at least one outlet operable to present coolant having a temperature that is different from the first temperature of the fluid stream. The conditioning device is operable to receive the fluid stream and the coolant and present the fluid stream to the coolant to change the first temperature of the fluid stream to be equal to the predetermined temperature.

18 Claims, 3 Drawing Sheets

APPARATUS FOR CONDITIONING TEMPERATURE OF A FLUID STREAM

BACKGROUND OF THE INVENTION

1. Field of the Invention

Embodiments of the present invention generally relate to a system and method for conditioning the temperature of at least one fluid stream that is passed through a fuel cell stack.

2. Background Art

It is generally well known that a number of fuel cells are joined together to form a fuel cell stack. Such a stack generally provides electrical power in response to electrochemically converting hydrogen and oxygen. It is also generally well know that membranes of each fuel cell are kept moist to facilitate performance and to prevent damage. Conventional systems deliver water in the air and hydrogen streams to ensure that such membranes are kept moist. While it is important to ensure that membranes are kept moist, too much water particularly in the liquid phase, in the air and hydrogen streams may lead to inefficient operation of the fuel cells in the stack.

Liquid water may be delivered to the membranes or inlets of the fuel cell stack if the air and hydrogen streams experience temperature loss prior to being delivered to the fuel cell stack. The membranes of the fuel cell stack may experience a shortage of water if the temperature of the air and hydrogen streams increase prior to being delivered to the fuel cell stack.

Accordingly, it would be desirable to provide a system and a method for conditioning the temperature of the hydrogen and air streams that are delivered to the fuel cell stack.

SUMMARY OF THE INVENTION

In one non-limiting embodiment, a system for conditioning the temperature of at least one fluid stream that is passed through a fuel cell stack is provided. The system comprises a system module, at least one inlet and a conditioning device. The system module is disposed upstream of the fuel cell stack and is operable to humidify the fluid stream so that the fluid stream reaches a predetermined humidity level and the predetermined humidity level corresponds to a predetermined temperature. The one inlet of the fuel cell stack is adapted to receive the fluid stream at a first temperature that is different from the predetermined temperature. The fuel cell stack includes at least one outlet that is operable to present coolant at a temperature that is different from the first temperature of the fluid stream in response to receiving the fluid stream. The conditioning device is operable to receive the fluid stream and the coolant and present the coolant to the fluid stream to change the first temperature of the fluid stream to be equal to the predetermined temperature so that the inlet of the fuel cell stack receives the fluid stream at the predetermined temperature.

DETAILED DESCRIPTION OF THE PREFERRED EMBODIMENT(S)

Figure 1:
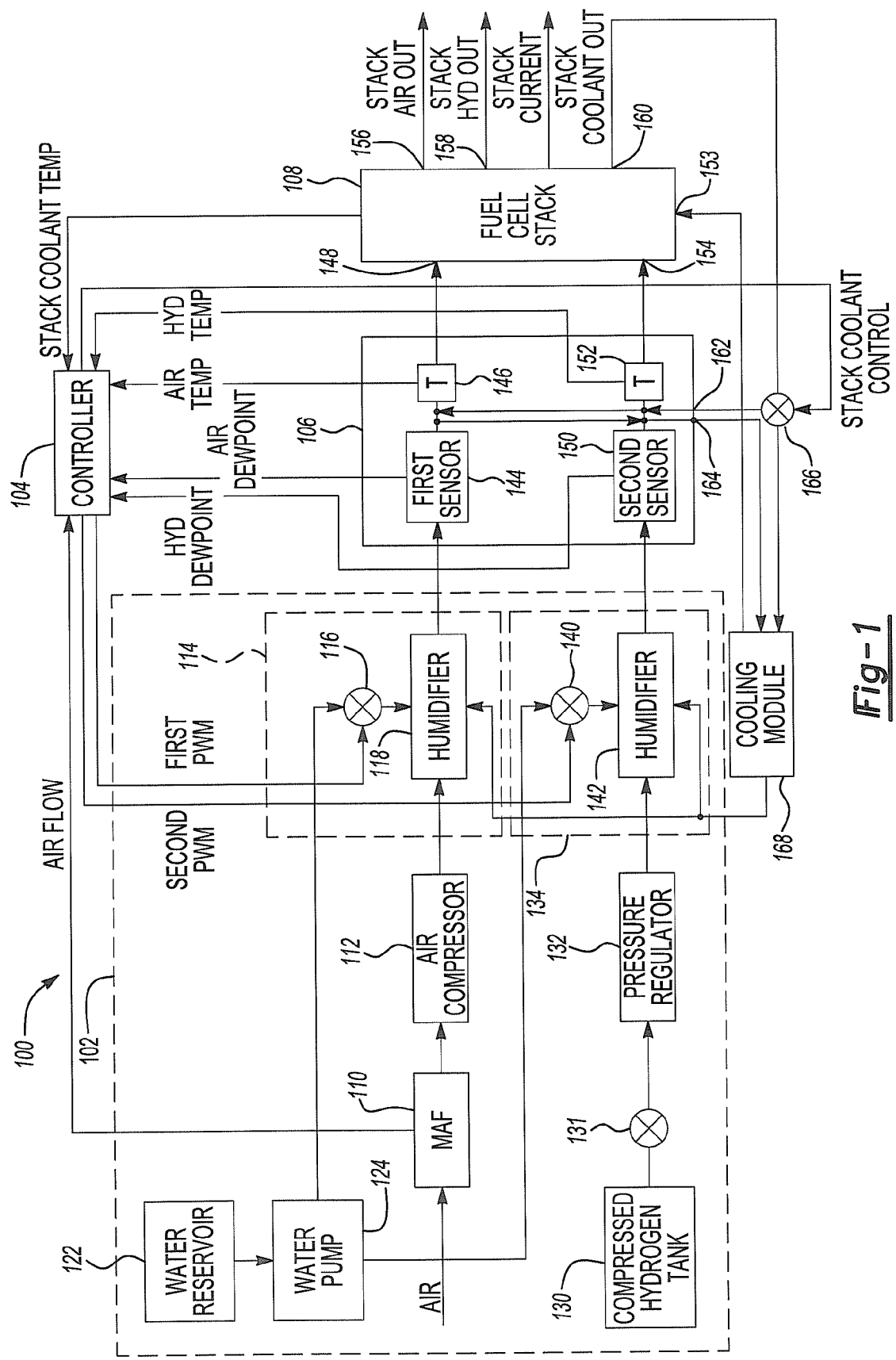
FIG. 1 illustrates an exemplary fuel cell stack humidity control and conditioning system in accordance with one embodiment of the present invention.

FIG. 1 illustrates an exemplary fuel cell stack humidity control and conditioning system 100 in accordance to one embodiment of the present invention. The system 100 may be implemented in an electric vehicle or hybrid vehicle or any such vehicle which uses voltage to drive a motor. The system generally comprises a system module 102, a controller 104, a conditioning device 106 and a fuel cell stack 108.

The system module 102 generates first and second fluid streams for the system 100. The first fluid stream which comprises air is fed to a mass airflow sensor 110. The air passing through the mass airflow sensor 110 may be dry air, or it may have a high water content. The mass airflow sensor 110 measures the amount and density of air in the fluid stream. An air compressor 112 pressurizes the air stream.

The system module 102 comprises a first humidifier arrangement 114 configured to add water in the air stream. The first humidifier arrangement 114 includes a water injector 116 and a humidifier 118. In one example, the first humidifier arrangement 114 may be implemented as a gas-to-gas humidifier. The particular type of humidifier arrangement used may be varied to meet the design criteria of a particular implementation. The controller 104 may control the water injector 116 with a first pulse width modulated (PWM) signal. The water injector 116 may be implemented as a solenoid or other valve and control the amount of water that is being added to humidifier 118 in response to the first PWM signal.

In one example not shown, the water injector valve 116 may be positioned between the mass airflow sensor 110 and the air compressor 112. In such an example, the water injection valve 116 may inject water directly into the compressor 112 and the humidifier 118 may be eliminated from the system 100.

The system module 102 comprises a water reservoir 122 and a water pump 124. The water pump 124 is coupled to the water injector 116. The water reservoir 122 provides water to the water injector 116 via the water pump 124. In one example, the fuel cell stack 108 may provide a water supply to the water reservoir 122. For example, the fuel cell stack 108 may generate water in response to combining chemicals from the air and hydrogen streams.

The system module 102 includes a tank 130 of compressed hydrogen which provides a second fluid stream. The second fluid stream comprises compressed hydrogen that can be used by the fuel cell stack 108. While compressed hydrogen may be used in the system 100, any hydrogen fuel source may be implemented in the system 100. For example, liquid hydrogen, hydrogen stored in various chemicals such as sodium borohydride or alanates, or hydrogen stored in metal hybrids may be used instead of compressed gas. A tank valve 131 controls the flow of hydrogen entering into the system 100. A pressure regulator 132 regulates the flow of the hydrogen. The hydrogen passing through the pressure regulator 132 may be dry hydrogen, or it may have a high water content. A second humidifier arrangement 134 is configured to add water into the hydrogen stream.

The second humidifier arrangement 134 includes a water injector 140 and a humidifier 142. In one example, the second humidifier arrangement 134 may be implemented as a gas-to-gas humidifier. The particular type of humidifier arrangement used may be varied to meet the design criteria of a particular implementation. The controller 104 may control the water injector 140 with a second PWM signal. The water injector 140 may be implemented as a solenoid or other valve and control the amount of water that is being added to humidifier 118 in response to the second PWM signal. The humidifier 142 introduces water into the hydrogen stream in response to the amount of water received by the water injector 140. The water pump 124 is coupled to the water injector 140. The water reservoir 122 provides water to the water injector 140 via the water pump 124.

The conditioning device 106 comprises a first sensor 144 configured to measure the dew point in the air stream. In one example, the first sensor 144 may be implemented as a capacitive complementary metal oxide semiconductor (CMOS) sensing element. The dew point is generally a function of relative humidity and temperature. The first sensor 144 may be adapted to measure any number of characteristics related to determining the amount of water in the air. The conditioning device 106 further comprises a temperature sensor 146. The temperature sensor 146 measures the temperature of the air stream. A first inlet 148 of the fuel cell stack 108 may receive the humidified air.

The conditioning device further comprises a second sensor 150 configured to measure the dew point in the hydrogen stream. The second sensor 150 may be implemented as a CMOS sensing element. The second sensor 150 may be adapted to measure any number of characteristics related to the amount of water in the hydrogen stream. A temperature sensor 152 measures the temperature of the hydrogen. A second inlet 154 of the fuel cell stack 108 may receive the humidified hydrogen stream.

The fuel cell stack 108 generally comprises a number of fuel cells (not shown) for generating power to drive a motor. In general, each fuel cell electrochemically converts oxygen from the air stream and hydrogen from the hydrogen stream to produce electricity and water. Membranes (not shown) facilitate the process of electrochemically converting oxygen and hydrogen to produce electricity and water. The fuel cell stack 108 generates stack current in response to each fuel cell converting oxygen and hydrogen into electricity and water. Such stack current may drive an electric motor (not shown) coupled to the fuel cell stack 108. The fuel cell stack 108 may provide information related to the stack current to the controller 120 via a current sensor (not shown). The fuel cell stack 108 comprises first, second and third outlets 156, 158 and 160. The first outlet 156 presents water and air generated from combining hydrogen and oxygen from the fuel cell stack 108. The second outlet 158 presents hydrogen from the fuel cell stack 108. The third outlet 160 presents coolant in the form of de-ionized (DI) water ethylene glycol or other suitable coolant from the fuel cell stack 108 in response to combining hydrogen with oxygen (e.g., from the air stream).

The conditioning device 106 comprises an input port 162 and an output port 164. The conditioning device 106 may be adapted to include two or more input or output ports. The number of input and output ports may be varied based on the design criteria of a particular implementation. A valve 166 may be adapted to control the amount of coolant that is delivered to the input port 162 of the conditioning device 106. A cooling module 168 (which is part of the vehicle heating and cooling system) is adapted to receive coolant from the output port 164 of the conditioning device 106 or the valve 166. An inlet 153 of the fuel cell stack 108 is adapted to receive the coolant from the cooling module 168. The cooling module 168 also presents coolant to the humidifiers 118 and 142.

In operation, the system 100 is adapted to ensure the proper levels of humidity in the air and hydrogen streams are delivered to the inlets 148, 154 to ensure proper operation of the membranes in the fuel cells in the fuel cell stack 108. In connection with the air stream, the controller 104 is adapted to control the humidifier arrangement 114 to deliver water to the air stream such that the air stream reaches a predetermined humidity level. The humidifier 118 is adapted to measure and present the amount of water in the air stream to the controller 104 thereby establishing a closed loop system with the controller 104. As noted above, the controller 104 controls the water injector 116 to dispense the corresponding amount of water into the humidifier 118. The humidifier 118 heats the water and releases a warm stream into the air stream thereby increasing the temperature of the air stream. The humidifier 118 may also cool the incoming air stream based on the temperature of the air stream at an outlet of the air compressor 112. The temperature of the air stream may also be based on the amount of compression of the air in the air compressor 112 and the temperature coolant presented to the humidifier 118 from the cooling module 168.

Once the predetermined humidity level of the air stream has been achieved, the corresponding temperature of the air stream at the predetermined humidity level is defined as the predetermined temperature. In one example, the predetermined humidity level may be established as disclosed in co-pending U.S. application Ser. No. 11/764,249, filed on Jun. 18, 2007, entitled "Fuel Cell Humidity Control System and Method," which is hereby incorporated in its entirety by reference. In another example, the controller 104 may use look up tables (stored in the controller 104) to determine the predetermined humidity level. In another example, the predetermined humidity level may be based on the temperature of the coolant at the inlet 153 of the fuel cell stack 108. The fuel cell stack 108 is configured to present the temperature of the coolant at the inlet 153 to the controller 104. The implementations as set forth for establishing the predetermined humidity level in the air stream also apply to the hydrogen stream.

In general, the predetermined humidity level of the air stream is the amount of water that is in the air stream that is sufficient to ensure proper operation of the membranes in the fuel cells in the fuel cell stack 108. In one example, due to the physical displacement between the system module 102 and the fuel cell stack 108 (or from other conditions that may exist in the system 100 that may reduce/increase the predetermined temperature to a first temperature), the air stream may encounter heat loss or gain which changes the temperature of the air stream from the predetermined temperature to the first temperature.

If the controller 104 determines that the first temperature is less than the predetermined temperature, then the controller 104 controls the valve 166 to allow for an increased amount of coolant to be delivered to the input port 162 of the conditioning device 106. The air stream is enclosed within a tube (not shown in FIG. 1) of the conditioning device 106 and is exposed to the heat of the coolant to increase the first temperature of the air stream to reach the predetermined temperature, or a temperature that is within a specified range of the predetermined temperature. The specified range may vary based on fuel cell stack requirements. For example, different fuel cell stacks may output coolant at different temperature levels during various operational modes of the vehicle thereby affecting the temperature of the coolant.

By maintaining the air stream at the predetermined temperature, or within the specified range, the system 100 is able to maintain the relative humidity target (e.g. based on the predetermined humidity level) as established via the controller 104 for the membranes. The fuel cell stack 108 is configured to present the temperature of the coolant to the controller 104.

If the controller 104 determines that the first temperature is greater than the predetermined temperature, then the controller 104 controls the valve 166 to decrease or stop the flow of coolant to the input port 162 of the conditioning device 106. The air stream is enclosed within a tube (not shown in FIG. 1) of the conditioning device 106 and is exposed to no coolant or a lesser amount of coolant to allow the first temperature to reach the predetermined temperature.

In connection with the hydrogen stream, the controller 104 is adapted to control the humidifier arrangement 134 to control the amount of water that is added to the hydrogen stream such that the hydrogen stream reaches a predetermined humidity level. The humidifier 142 is adapted to measure and present the amount of water in the hydrogen stream to the controller 104 thereby establishing a closed loop system with the controller 104. As noted above, the controller 104 controls the water injector 140 to dispense the corresponding amount of water into the humidifier 142. The humidifier 142 heats the water and releases a warm stream into the hydrogen stream thereby increasing the temperature of the hydrogen stream. The humidifier 142 may also cool the hydrogen streams. As noted in connection with the heating of the air stream, the recirculation of the coolant from the cooling module 168 to the humidifier 142 provides a heat source to heat the hydrogen stream.

Once the predetermined humidity level of the hydrogen stream has been achieved, the corresponding temperature of the hydrogen stream at the predetermined humidity level is defined as the predetermined temperature. In general, the predetermined humidity level of the hydrogen stream is the amount of water that is in the hydrogen stream that is sufficient to ensure proper operation of the membranes in the fuel cells in the fuel cell stack 108. In one example, due to the physical displacement between the system module 102 and the fuel cell stack 108 (or from other conditions that may exist in the system 100 that may reduce/increase the predetermined temperature to the first temperature), the predetermined temperature of the hydrogen stream may encounter heat loss which changes the temperature of the hydrogen stream from the predetermined temperature to a first temperature.

If the controller 104 determines that the first temperature is less than the predetermined temperature, then the controller 104 controls the valve 166 to allow for an increased amount of coolant to be delivered to the input port 162 of the conditioning device 106. The hydrogen stream is enclosed within a tube of the conditioning device 106 and is exposed to the heat of the coolant to increase the first temperature of the hydrogen stream to reach the predetermined temperature. By maintaining the hydrogen stream at the predetermined temperature, the system 100 is able to maintain the relative humidity target (e.g. based on the predetermined humidity level) as established via the controller 104 for the membranes.

If the controller 104 determines that the first temperature is greater than the predetermined temperature, then the controller 104 controls the valve 166 to decrease or stop the flow of coolant to the input port 162 of the conditioning device 106. The hydrogen stream is enclosed within a tube (not shown) of the conditioning device 106 and is exposed to no coolant or a lesser amount of coolant to allow the first temperature to reach the predetermined temperature.

While FIG. 1 illustrates the conditioning device 106 being implemented outside of the fuel cell stack 108, the fuel cell stack 108 may be adapted to include conditioning device 106. With such an implementation, the conditioning device 106 may ensure that the predetermined humidity level of the air and gas streams are achieved prior to the streams reaching the fuel cells (not shown) of the fuel cell stack 106.

Figure 2:
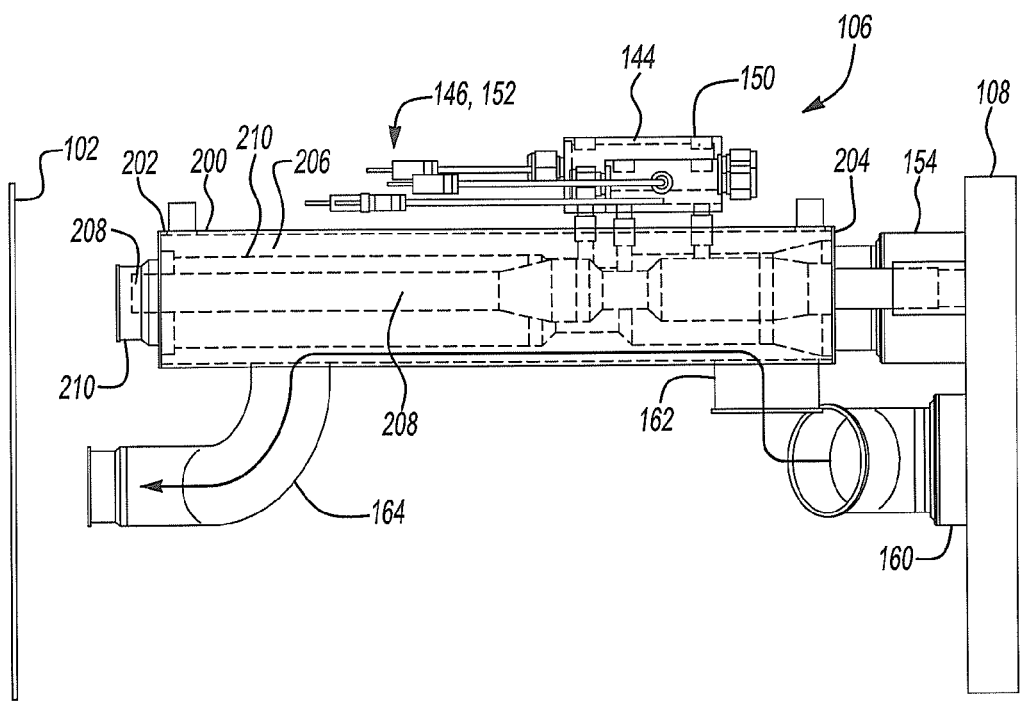
FIG. 2 illustrates a first side view of a conditioning device in accordance with one embodiment of the present invention.
Figure 3:
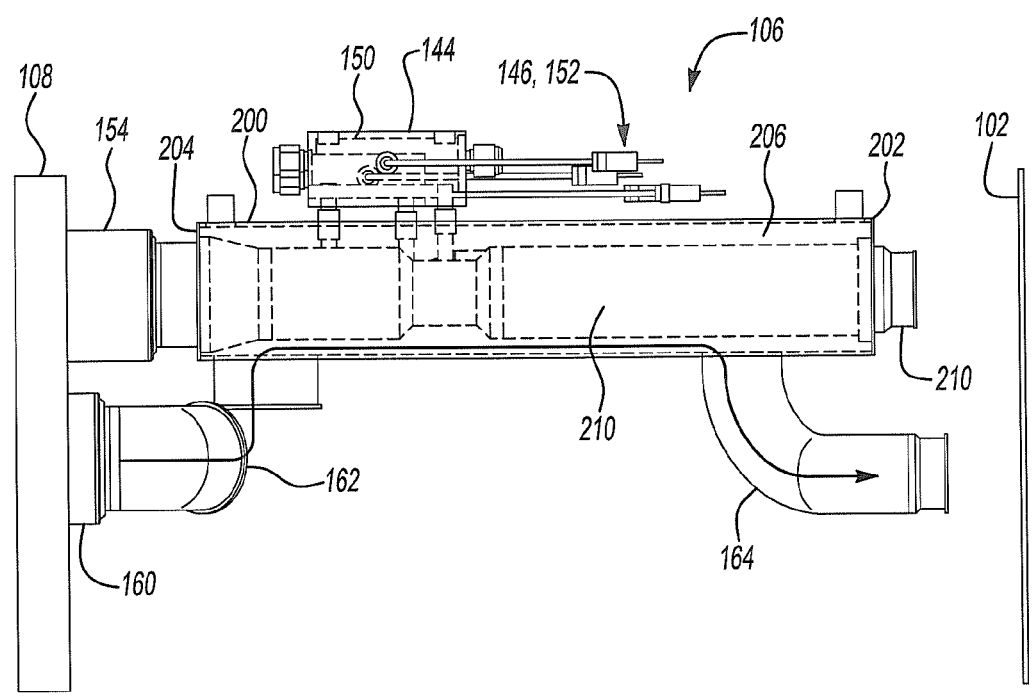
FIG. 3 illustrates a second side view of the conditioning device in accordance with one embodiment of the present invention.
Figure 4:
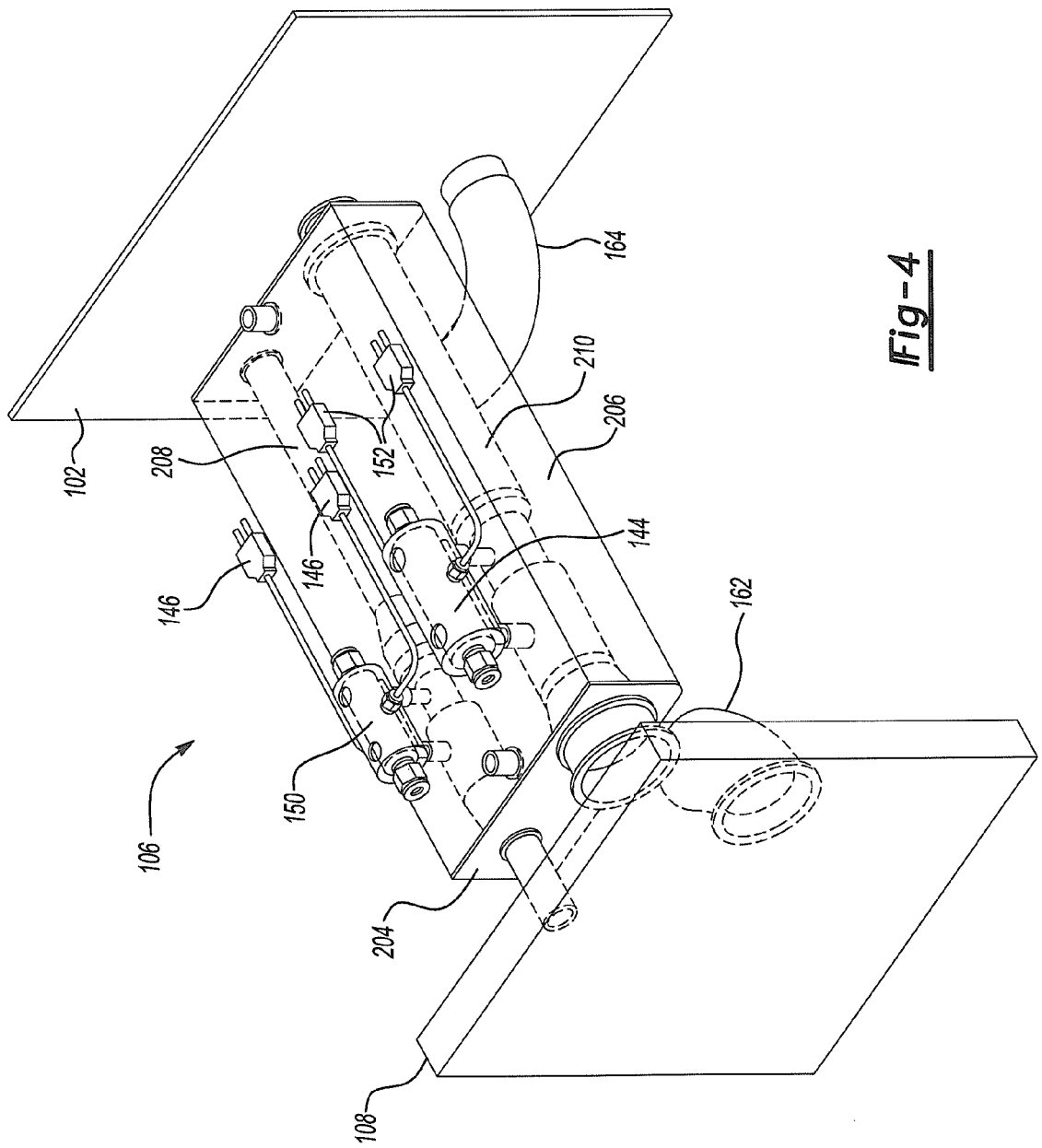
FIG. 4 illustrates an elevated view of the conditioning device in accordance with one embodiment of the present invention.

FIGS. 2-4 illustrates various views of the conditioning device 106. The conditioning device 106 comprises an outer shell 200. The outer shell 200 includes a first end 202 orientated toward the system module 102 and a second end 204 orientated toward the fuel cell stack interface (or the inlets 148, 154 of the fuel cell stack 108). The outer shell 200 includes a cavity 206. A first pipe 208 is disposed within the outer shell 200 and extends through the cavity 206 and out of the ends 202, 204. The first pipe 208 delivers the hydrogen stream from the system module 102 to the fuel cell stack 108. A second pipe 210 is disposed within the outer shell 200 and extends through the cavity 206 and out of the ends 202, 204. The second pipe 210 delivers the air stream from the system module 102 to the fuel cell stack 108.

The input port 162 is disposed at the second end 204 of the outer shell 200. The output port 164 is disposed at the first end 202 of the outer shell 200. The input port 162 is coupled to the outlet 160 of the fuel cell stack 108 and adapted to receive coolant from the fuel cell stack 108. The coolant is passed over the first and second pipes 208, 210 to heat the air and hydrogen streams to the predetermined temperature. The output port 164 delivers coolant away from the conditioning device 106 and to the cooling module 168.

The first and second sensors 144, 150 are coupled to the outer shell 200 and to the first and second pipes 208, 210 respectively. The first and second sensors 144, 150 are exposed to the air and hydrogen streams to measure the amount of water in the streams. The temperature sensors 146, 152 are coupled to the first and second sensors 144, 150 respectively.

In one embodiment, the conditioning device 106 may be packaged within the fuel cell stack 108. In addition, the conditioning device 106 may be implemented without the first and second sensors 144, 150 and the temperature sensors 146, 152 to allow for an open loop system such that the conditioning device 106 applies coolant to the air and hydrogen streams to increase the temperatures of the air and hydrogen streams to compensate for any heat losses that occur with the delivery of the air and hydrogen streams to the fuel cell stack.

While the best mode for carrying out the invention has been described in detail, those familiar with the art to which this invention relates will recognize various alternative designs and embodiments for practicing the invention as defined by the following claims.

What is claimed:

1. A system for conditioning a temperature of at least one fluid stream that is passed through a fuel cell stack, the system comprising:

a system module disposed upstream of the fuel cell stack and operable to humidify an anode stream and a cathode stream;

a fuel cell stack adapted to receive the anode stream and the cathode stream, the fuel cell stack having at least one outlet that provides coolant in response to receiving the anode stream and the cathode stream; and a conditioning device operable to receive the anode stream, the cathode stream, and the coolant to change the temperature of the anode stream and the cathode stream with the coolant, the conditioning device comprising:

an outer shell defining a cavity therein;

a first pipe extending through the cavity to deliver the anode stream to the fuel cell stack at a first temperature;

a second pipe being spaced apart from the first pipe within the outer shell and extending through the cavity to deliver the cathode stream to the fuel cell stack at a second temperature; and an input port coupled to the outer shell to deliver the coolant from the fuel cell stack to the first pipe and to the second pipe to change the first temperature of the anode stream and the second temperature of the cathode stream.

2. The system of claim 1 wherein the conditioning device further comprises an output port coupled to the outer shell to deliver the coolant away from the conditioning device.

3. The system of claim 1 wherein the conditioning device further comprises a first temperature sensor being in fluid communication with the anode stream in the first pipe to measure the first temperature.

4. The system of claim 3 wherein the first temperature sensor is configured to transmit a temperature signal indicative of the measured first temperature to a controller to control an amount of coolant that is delivered to the first pipe.

5. The system of claim 3 wherein the conditioning device further comprises a second temperature sensor being in fluid communication with the cathode stream in the second pipe to measure the second temperature.

6. The system of claim 5 wherein the second temperature sensor is configured to transmit a temperature signal indicative of the measured second temperature to a controller to control an amount of coolant that is delivered to the second pipe.

7. The system of claim 1 wherein the conditioning device further comprises a first humidity sensor positioned on an exterior section of the outer shell and being coupled to the first pipe to measure an amount of water within the anode stream.

8. The system of claim 7 wherein the conditioning device further comprises a second humidity sensor positioned on the exterior section of the outer shell and being coupled to the second pipe to measure an amount of water within the cathode stream.

9. The system of claim 1 wherein the conditioning device is positioned exterior to the fuel cell stack.

10. The system of claim 1 wherein the conditioning device is positioned interior to the fuel cell stack.

11. An apparatus in a system for conditioning a temperature of at least one fluid stream that is passed through a fuel cell stack, the system including a system module operable to humidify an anode stream and a cathode stream and a fuel cell stack adapted to receive the anode stream and the cathode stream and to provide coolant, the apparatus comprising:

a conditioning device operable to receive the anode stream, the cathode stream and the coolant to change a temperature of the anode stream and the cathode stream with the coolant, the conditioning device comprising:

an outer shell defining a cavity therein;

a first pipe extending through the cavity to deliver the anode stream to a fuel cell stack at a first temperature;

a second pipe being spaced apart from the first pipe and within the outer shell and extending through the cavity to deliver the cathode stream to the fuel cell stack at a second temperature; and an input port being coupled to the outer shell to receive the coolant and to deliver the coolant into the cavity to change the first temperature of the anode stream and the second temperature of the cathode stream.

12. The apparatus of claim 11 wherein the conditioning device further comprises an output port coupled to the outer shell to deliver the coolant away from the conditioning device.

13. The apparatus of claim 11 wherein the conditioning device further comprises a first temperature sensor being in fluid communication with the anode stream in the first pipe to measure the first temperature.

14. The apparatus of claim 13 wherein the first temperature sensor is configured to transmit a temperature signal indicative of the measured first temperature to a controller to control an amount of coolant that is delivered to the first pipe.

15. The apparatus of claim 13 wherein the conditioning device further comprises a second temperature sensor being in fluid communication with the cathode stream in the second pipe to measure the second temperature thereof.

16. The apparatus of claim 15 wherein the second temperature sensor is configured to transmit a temperature signal indicative of the measured second temperature to a controller to control an amount of coolant that is delivered to the second pipe.

17. The apparatus of claim 11 wherein the conditioning device further comprises a first humidity sensor positioned on an exterior section of the outer shell and being coupled to the first pipe to measure an amount of water within the anode stream.

18. The apparatus of claim 17 wherein the conditioning device further comprises a second humidity sensor positioned on the exterior section of the outer shell and being coupled to the second pipe to measure an amount of water within the cathode stream.

* * * * *